(12) United States Patent
Ge et al.

(10) Patent No.: US 10,127,645 B2
(45) Date of Patent: Nov. 13, 2018

(54) SINGLE-MOLECULE IMAGE CORRECTION METHOD, DEVICE AND SYSTEM, AND COMPUTER-READABLE STORAGE MEDIUM

(71) Applicant: DIRECT GENOMICS CO., LTD., Shenzhen (CN)

(72) Inventors: Liangjin Ge, Shenzhen (CN); Jianming Zeng, Shenzhen (CN); Qin Yan, Shenzhen (CN)

(73) Assignee: DIRECT GENOMICS CO., LTD, Shenzhen (CN)

( * ) Notice: Subject to any disclaimer, the term of this patent is extended or adjusted under 35 U.S.C. 154(b) by 0 days.

(21) Appl. No.: 15/752,821

(22) PCT Filed: Aug. 11, 2016

(86) PCT No.: PCT/CN2016/094671
§ 371 (c)(1),
(2) Date: Feb. 14, 2018

(87) PCT Pub. No.: WO2017/028739
PCT Pub. Date: Feb. 23, 2017

(65) Prior Publication Data
US 2018/0240222 A1 Aug. 23, 2018

(30) Foreign Application Priority Data

Aug. 14, 2015 (CN) .......................... 2015 1 0500962
Aug. 14, 2015 (CN) .......................... 2015 1 0501154

(51) Int. Cl.
*G06K 9/00* (2006.01)
*G06T 5/50* (2006.01)
(Continued)

(52) U.S. Cl.
CPC ................ *G06T 5/50* (2013.01); *G06F 17/16* (2013.01); *G06T 7/37* (2017.01)

(58) Field of Classification Search
CPC ........ G06F 19/12; G06F 19/26; G06F 19/708; G06F 17/16; G06T 5/50; G06T 7/37
See application file for complete search history.

(56) References Cited

U.S. PATENT DOCUMENTS

| 2006/0247515 | A1* | 11/2006 | Moriguchi | ......... G01R 33/4824 |
| | | | | 600/414 |
| 2016/0019334 | A1* | 1/2016 | Cai | ......................... G06F 19/26 |
| | | | | 506/8 |
| 2018/0135119 | A1* | 5/2018 | Yan | ..................... G01N 21/6458 |

FOREIGN PATENT DOCUMENTS

| CN | 101377848 A | 3/2009 |
| CN | 101482972 A | 7/2009 |

(Continued)

*Primary Examiner* — Wesley J Tucker
(74) *Attorney, Agent, or Firm* — Seed IP Law Group LLP (57) ABSTRACT

An embodiment of the present disclosure discloses a method and a device of correcting a single-molecule image, the method includes: acquiring the first target simplified matrix corresponding to the first image according to the intensity matrix corresponding to each of pixels in the first image, and acquiring the second target simplified matrix corresponding to the second image according to the intensity matrix corresponding to each of the pixels in the second image; the two-dimensional DFT is performed to the first target simplified matrix and the second target simplified matrix respectively to acquire the first Fourier matrix corresponding to the first target simplified matrix and the second Fourier matrix corresponding to the second target simplified matrix; the method of correcting a single-molecule image acquire the offset of the second image with respect to the first image according to the first Fourier matrix and the second Fourier matrix; and correcting the second image according to the (Continued)

offset. Such method can correct the images of single molecules taken at different moments.

19 Claims, 4 Drawing Sheets

(51) Int. Cl.
    *G06F 17/16*     (2006.01)
    *G06T 7/37*     (2017.01)

(56) References Cited

FOREIGN PATENT DOCUMENTS

| | | |
|---|---|---|
| CN | 101751572 A | 6/2010 |
| CN | 101976434 A | 2/2011 |
| CN | 103905746 A | 7/2014 |
| CN | 105303540 A | 2/2016 |
| CN | 105303541 A | 2/2016 |
| EP | 0 741 368 A1 | 11/1996 |

\* cited by examiner

$$\begin{matrix} a_{11} & a_{12} & a_{13} & a_{14} & a_{15} & a_{16} & \ldots & a_{1n} \\ a_{21} & a_{22} & a_{23} & a_{24} & a_{25} & a_{26} & \ldots & a_{2n} \\ a_{31} & a_{32} & a_{33} & a_{34} & a_{35} & a_{36} & \ldots & a_{3n} \\ a_{41} & a_{42} & a_{43} & a_{44} & a_{45} & a_{46} & \ldots & a_{4n} \\ a_{51} & a_{52} & a_{53} & a_{54} & a_{55} & a_{56} & \ldots & a_{5n} \\ \ldots & \ldots & \ldots & \ldots & \ldots & \ldots & \ldots & \ldots \\ a_{n1} & a_{n2} & a_{n3} & a_{n4} & a_{n5} & a_{n6} & \ldots & a_{nn} \end{matrix}$$

FIG. 5

FIG. 6

SINGLE-MOLECULE IMAGE CORRECTION METHOD, DEVICE AND SYSTEM, AND COMPUTER-READABLE STORAGE MEDIUM

CROSS-REFERENCE TO RELATED APPLICATION

This application claims priority to Chinese Patent Application Nos. 201510500962.8 and 201510501154.3, filed Aug. 14, 2015, the contents of which are expressly incorporated by reference herein in their entirety.

TECHNICAL FIELD

The present disclosure relates to the field of computer technology, and particularly relates to a method, device, system and computer-readable storage medium of correcting a single-molecule image.

BACKGROUND

With the development of sequencing technology, the single-molecule sequencing technology has become a popular one of the sequencing techniques. In the single-molecule sequencing process, randomly distributing probes are fixed on the surface of the glass, which will capture sequences that can match thereto, and there are fluorophores (e.g., CY3) on the sequences; the fluorophores are excited by a laser with a particular wavelength, a gray image can be acquired after an Electron-Multiplying CCD (EM-CCD) imaging. In a single-molecule sequencing, single molecules within a same coordinate view photographed at different moments, and a DNA sequence over time of the single molecules can be acquired according to the single-molecule images taken at different moments. It is found in practice however, when single molecules in the same coordinate view are photographed at different moments, the swing of the sequence in the liquid on the chip will result that the same single molecule has different position information on different images. As the position information of the single molecule in the single-molecule image is different, the DNA sequence of the single molecule over time cannot be determined. As such, it demands prompt solution on the correction of the images of single molecules taken at different moments.

SUMMARY

The embodiments of the present disclosure disclose a method, device, system and computer-readable storage medium of correcting a single-molecule image, which can correct single-molecule images taken at different moments.

The embodiments of the present disclosure disclose a method of correcting a single-molecule image, includes: acquiring a first target simplified matrix corresponding to a first image according to an intensity matrix corresponding to each of pixels in the first image, and acquire a second target simplified matrix corresponding to a second image according to an intensity matrix corresponding to each of the pixels in the second image; the intensity matrix corresponding to each of the pixels is a matrix with the intensity of such pixel as the center and having intensity of pixels of a preset number of rows and a preset number of columns; performing a two-dimensional discrete Fourier transform (DFT) to the first target simplified matrix and the second target simplified matrix respectively to acquire a first Fourier matrix corresponding to the first target simplified matrix and a second Fourier matrix corresponding to the second target simplified matrix; acquiring an offset of the second image with respect to the first image according to the first Fourier matrix and the second Fourier matrix; and correcting the second image according to the offset.

In the embodiments of the present disclosure, the method of correcting a single-molecule image, after acquiring the first target simplified matrix corresponding to the first image according to the intensity matrix corresponding to each of pixels in the first image, and acquiring the second target simplified matrix corresponding to the second image according to the intensity matrix corresponding to each of the pixels in the second image; the two-dimensional DFT is performed to the first target simplified matrix and the second target simplified matrix respectively to acquire the first Fourier matrix corresponding to the first target simplified matrix and the second Fourier matrix corresponding to the second target simplified matrix; the method of correcting a single-molecule image acquire the offset of the second image with respect to the first image according to the first Fourier matrix and the second Fourier matrix; and correcting the second image according to the offset. As such, the embodiments of the present disclosure can correct the images of single molecules taken at different moments.

The embodiments of the present disclosure disclose a device of correcting a single-molecule image, includes: a first acquiring module configured to acquire a first target simplified matrix corresponding to a first image according to an intensity matrix corresponding to each of pixels in the first image, and acquire a second target simplified matrix corresponding to a second image according to an intensity matrix corresponding to each of the pixels in the second image; the intensity matrix corresponding to each of the pixels is a matrix with such pixel as the center and having intensity of pixels of a preset number of rows and a preset number of columns; a transforming module configured to perform a two-dimensional DFT to the first target simplified matrix and the second target simplified matrix respectively to acquire a first Fourier matrix corresponding to the first target simplified matrix and a second Fourier matrix corresponding to the second target simplified matrix; a second acquiring module configured to acquire an offset of the second image with respect to the first image according to the first Fourier matrix and the second Fourier matrix; and a correction module configured to correct the second image according to the offset.

In the embodiments of the present disclosure, after the first acquiring module acquires the first target simplified matrix corresponding to the first image according to the intensity matrix corresponding to each of pixels in the first image, and acquires the second target simplified matrix corresponding to the second image according to the intensity matrix corresponding to each of the pixels in the second image; the transforming module performs the two-dimensional DFT to the first target simplified matrix and the second target simplified matrix respectively to acquire the first Fourier matrix corresponding to the first target simplified matrix and the second Fourier matrix corresponding to the second target simplified matrix; the second acquiring module acquires the offset of the second image with respect to the first image according to the first Fourier matrix and the second Fourier matrix; and the correction module corrects the second image according to the offset. As such, the embodiments of the present disclosure can correct the images of single molecules taken at different moments.

The embodiments of the present disclosure disclose a system of correcting a single-molecule image, includes: a data input unit configured to input data; a data output unit configured to output data; a memory configured to store data, the data comprises a computer-readable program; a processor configured to execute the computer-readable program, the execution of the computer-readable program comprises completing methods according to either one of the foregoing methods. As such, the embodiments of the present disclosure can correct the images of single molecules taken at different moments.

The embodiments of the present disclosure disclose a computer-readable storage medium configured to store a program for a computer to execute, the execution of the program comprises completing methods according to either one of the foregoing methods. As such, the embodiments of the present disclosure can correct the images of single molecules taken at different moments.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are some embodiments of the present invention, and persons of ordinary skill in the art can derive other drawings from the accompanying drawings without creative efforts.

DETAILED DESCRIPTION OF THE EMBODIMENTS

The technical solutions according to the embodiments of the present invention will be described clearly and completely in combination with accompanying drawings. Apparently, the following description are some embodiments, as opposed to all embodiments, of the present invention. In view of the embodiments of the present disclosure, other embodiments derived by persons of ordinary skill in the art without creative efforts shall be considered within the scope of the invention.

A method and device of correcting a single-molecule image are disclosed in the embodiments of the present disclosure, which can correct the images of single molecules taken at different moments and will be respectively described in detail.

Figure 1:
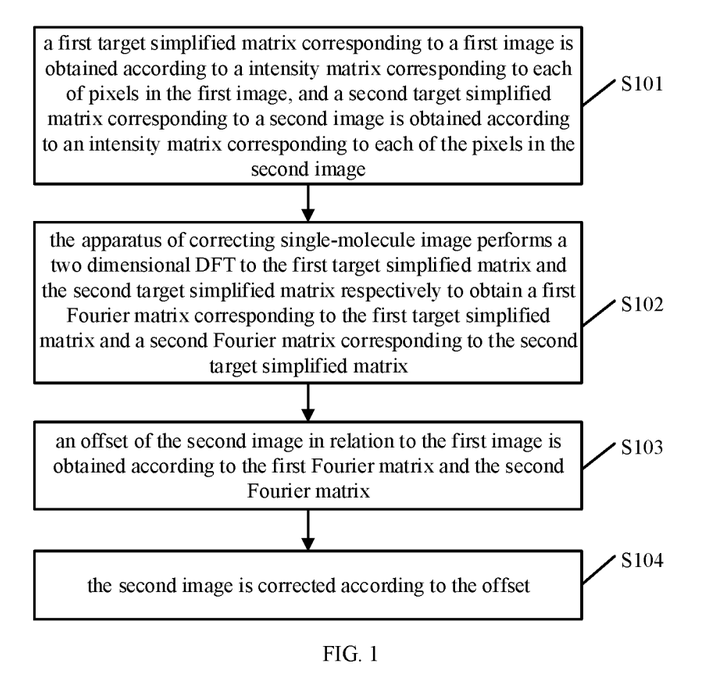
FIG. 1 is a flowchart of a method of correcting a single-molecule image according to an embodiment.

Referring to FIG. 1, which is a flowchart of a method of correcting a single-molecule image according to an embodiment. As shown in FIG. 1 the method of correcting a single-molecule image includes the following steps. And a device of correcting a single-molecule image can be used to implement the method of correcting a single-molecule image.

In step S101, a first target simplified matrix corresponding to a first image is acquired according to an intensity matrix corresponding to each of pixels in the first image, and a second target simplified matrix corresponding to a second image is acquired according to an intensity matrix corresponding to each of the pixels in the second image.

In the embodiments of the present disclosure, the device of correcting a single-molecule image is not limited to a smart phone, a tablet, a notebook computer, a desktop computer or other user equipment. The operating system (OS) of the device of correcting a single-molecule image is not limited to the Android OS, the IOS OS, the Symbian OS, the Black Berry OS, the Windows OS and so on, there is no limitation in the embodiments of the present disclosure in this respect.

In the embodiments of the present disclosure, a first image is an image taken at a first point of time, a second image is an image taken at a second point of time, the second point of time is later than the first point of time. When a user intends to correct a difference between the first image and the second image, the user can import the first image and the second image into the device of correcting a single-molecule image.

After reading/inputting the first image and the second image, with respect to each of pixels of the first image, an intensity matrix corresponding to each of the pixels of the first image is determined, and with respect to each of the pixels of the second image, an intensity matrix corresponding to each of the pixels of the second image is determined. The intensity matrix corresponding to each of the pixels is a matrix with the intensity of such pixel as the center and having intensity of pixels of a preset number of rows and a preset number of columns. For example, the intensity matrix corresponding to a pixel can be a 3*3, 5*5, 7*7 matrix with the intensity of such pixel as the center, there is no limitation in the embodiments of the present disclosure in this respect.

Figure 5:
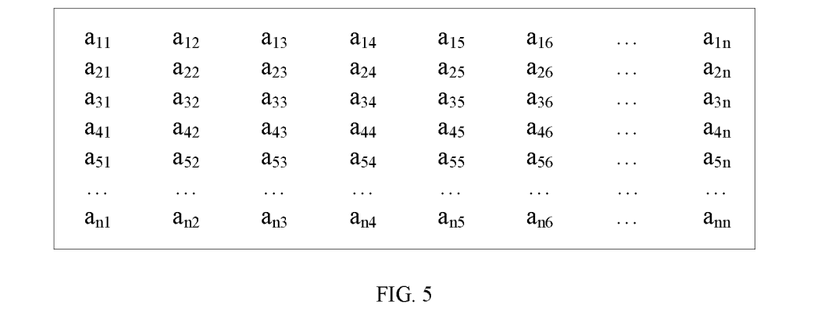
FIG. 5 is a schematic diagram of the distribution of pixels in a first image according to an embodiment.

Taking the first image as an example, in the case there are 512*512 pixels in the first image, 512*512 intensity matrices will be determined in total. As shown in FIG. 5, FIG. 5 is a schematic diagram of the distribution of the pixels of the first image, n is 512, $a_{11}$ is a pixel at the first row and first column, $a_{12}$ is a pixel at the first row and the second column, $a_{1n}$ is a pixel at the first row and the column n . . . and $a_{nn}$ is a pixel at row n and column n. If the intensity matrix is a 3*3 matrix, 3*3 pixels with $a_{11}$ as the center are selected from the first image when the intensity matrix corresponding to $a_{11}$ is determined by the device of correcting a single-molecule image. Among the pixels of the first image, the 3*3 pixels with $a_{11}$ as the center only includes $a_{12}$, $a_{21}$, and $a_{22}$, intensity of $a_{11}$, $a_{12}$, $a_{21}$, and $a_{22}$ will be acquired, and intensity of the 3*3 pixels with $a_{11}$ as the center that do not present in the pixels of the first image are set up to be 0; intensity of 3*3 pixels with $a_{11}$ as the center form an intensity matrix corresponding to $a_{11}$.

For example, if the intensity corresponding to $a_{11}$ is $L_{11}$, the intensity corresponding to $a_{12}$ is $L_{12}$, the intensity corresponding to $a_{21}$ is $L_{21}$, the intensity corresponding to $a_{22}$ is $L_{22}$, then the intensity matrix $A_{11}$ corresponding to $a_{11}$ is $$A_{11} = \begin{bmatrix} 0 & 0 & 0 \\ 0 & L_{11} & L_{12} \\ 0 & L_{21} & L_{22} \end{bmatrix},$$

the intensity matrix $A_{12}$ corresponding to $a_{12}$ is $$A_{12} = \begin{bmatrix} 0 & 0 & 0 \\ L_{11} & L_{12} & L_{13} \\ L_{21} & L_{22} & L_{23} \end{bmatrix},$$

$L_{13}$ is the intensity of $a_{13}$, and $L_{23}$ is the intensity of $a_{23}$. Likewise, the intensity matrix $A_{22}$ corresponding to $a_{22}$ is $$A_{22} = \begin{bmatrix} L_{11} & L_{12} & L_{13} \\ L_{21} & L_{22} & L_{23} \\ L_{31} & L_{32} & L_{33} \end{bmatrix},$$

$L_{31}$ is the intensity of $a_{31}$, $L_{32}$ is the intensity of $a_{32}$, and $L_{33}$ is the intensity of $a_{33}$.

The principle to determine the intensity matrix corresponding to each of the pixels of the second image is the same to the principle to determine the intensity matrix corresponding to each of the pixels of the first image, and is thus omitted for brevity.

As an optional embodiment, the first target simplified matrix and the second target simplified matrix are both binary matrices.

As an optional embodiment, the a first target simplified matrix corresponding to a first image is acquired according to an intensity matrix corresponding to each of the pixels of a first image particularly includes: 11) a similarity value of an intensity matrix corresponding to each of the pixels of the first image and a preset matrix is calculated to acquire a first similarity value matrix; 12) each of the similarity values in the first similarity value matrix is compared with a preset threshold value to acquire comparison results corresponding to each of the similarity values in the first similarity value matrix; 13) each of the similarity values in the first similarity value matrix is classified according to the comparison result corresponding to each of the similarity values in the first similarity value matrix to acquire a first target simplified matrix corresponding to the first image.

In the present embodiment, a preset matrix is preset, which has the same number of rows and number of columns with the intensity matrix, and the element of the preset matrix are intensity. After the intensity matrix corresponding to each of the pixels of the first image is determined, with respect to each intensity matrix, a similarity value of an intensity matrix and a preset matrix is calculated, and all similarity values acquired are regarded as elements of the matrix to form a first similarity value matrix. The particular embodiment to acquire the similarity of the two matrices are known in the art and is therefore omitted for brevity.

For example, when the first image has 512*512 pixels, as shown in FIG. 5, n is 512, a11 is a pixel at the first row and first column, a12 is a pixel at the first row and the second column, a1n is a pixel at the first row and column n . . . and ann is a pixel at row n and column n. If the similarity value corresponding to a11 is S11, the similarity value corresponding to a11 is S11, the similarity value corresponding to a12 is S12 . . . the similarity value corresponding to a1n is S1n, then the similarity value matrix $$S = \begin{bmatrix} S_{11} & \cdots & S_{1n} \\ \cdots & \cdots & \cdots \\ S_{n1} & \cdots & S_{nm} \end{bmatrix}.$$

In the present embodiment, a preset threshold is previously set, for example, the preset threshold can be a value greater than 0 and less than 1, there is no limitation in this respect in the embodiments of the present disclosure. The device of correcting a single-molecule image compares each of the similarity values in the first similarity value matrix with the preset threshold value to acquire comparison results corresponding to each of the similarity values in the first similarity value matrix. Such comparison result can be that the similarity value is greater than the preset threshold, the similarity value is equal to the preset threshold, or the similarity value is less than the preset threshold. Each of the similarity values in the first similarity value matrix is classified according to the comparison result to acquire the simplified matrix of the target image.

As an optional embodiment, each of the similarity values in the first similarity value matrix is classified according to the comparison results to acquire the simplified matrix of the target image particularly by: with respect to each of the similarity values in the first similarity value matrix, when the comparison result corresponding to the similarity value is that the similarity value is greater or equal to the preset threshold, classifying the similarity value as a first class, and when the comparison result corresponding to the similarity value is that the similarity value is less than the preset threshold, classifying the similarity value as a second class, so as to acquire a first target simplified matrix corresponding to the first image.

For example, in certain embodiments, when the first target simplified matrix is a binary matrix and when the comparison result corresponding to the similarity value is greater or equal to the preset threshold, the similarity value is classified as 1 (a first class), and when the comparison result corresponding to the similarity value is that the similarity value is less than the preset threshold, the similarity value is classified as 0 (a second class), so as to acquire a first target binary matrix corresponding to the first image.

In a particular embodiment, the first class can be understood as the image pixels corresponding to the first class are image pixels required in locating single molecules, a second class can be understood as the image pixels corresponding to the first class are image pixels not required in locating single molecules, which are pixels can be removed or ignored in an image processing process.

As an example, the first target simplified matrix is described as a binary matrix as follows, other simplified matrix can be understood with reference to the following.

In the example of the embodiment, for a 3*3 first similarity value matrix, if S11~S13, S21~S23 are similarity values greater or equal to the preset threshold, and S31~S33 are similarity values less than the preset threshold, a binary matrix $$X = \begin{bmatrix} 1 & 1 & 1 \\ 1 & 1 & 1 \\ 0 & 0 & 0 \end{bmatrix}$$

is acquired.

As an optional embodiment, the second target simplified matrix corresponding to a second image is acquired according to an intensity matrix corresponding to each of the pixels of a second image particularly includes: 21) a similarity value of an intensity matrix corresponding to each of the pixels of the second image and a preset matrix is calculated to acquire a second similarity value matrix; 22) each of the similarity values in the second similarity value matrix is compared with a preset threshold value to acquire comparison results corresponding to each of the similarity values in the second similarity value matrix; 23) each of the similarity values in the second similarity value matrix is classified according to the comparison result corresponding to each of the similarity values in the second similarity value matrix to acquire a second target simplified matrix corresponding to the second image.

The implementing principle of steps 21)~23) is similar to that of steps 11)~13) and is omitted for brevity.

As an optional embodiment, each of the similarity values in the second similarity value matrix is classified according to the comparison results to acquire the simplified matrix of the target image particularly by: with respect to each of the similarity values in the second similarity value matrix, when the comparison result corresponding to the similarity value is that the similarity value is greater or equal to the preset threshold, classifying the similarity value as a first class, and when the comparison result corresponding to the similarity value is that the similarity value is less than the preset threshold, classifying the similarity value as a second class, so as to acquire a second target simplified matrix corresponding to the second image.

For example, in certain embodiments, when the second target simplified matrix is a binary matrix and when the comparison result corresponding to the similarity value is greater or equal to the preset threshold, the similarity value is classified as 1 (a first class), and when the comparison result corresponding to the similarity value is that the similarity value is less than the preset threshold, the similarity value is classified as 0 (a second class), so as to acquire a second target binary matrix corresponding to the second image.

As an example, the second target simplified matrix is described as a binary matrix as follows, other simplified matrix can be understood with reference to the following.

In the example of the embodiment, for a 3*3 second similarity value matrix, if S11~S13, S21~S23 are similarity values greater or equal to the preset threshold, and S31~S33 are similarity values less than the preset threshold, a binary matrix $$X = \begin{bmatrix} 1 & 1 & 1 \\ 1 & 1 & 1 \\ 0 & 0 & 0 \end{bmatrix}$$

is acquired.

In step S102, the device of correcting the single-molecule image performs a two-dimensional DFT to the first target simplified matrix and the second target simplified matrix respectively to acquire a first Fourier matrix corresponding to the first target simplified matrix and a second Fourier matrix corresponding to the second target simplified matrix.

As an example, the first target simplified matrix and the second target simplified matrix are described as a binary matrix as follows, other simplified matrix can be understood with reference to the following.

In the embodiments of the present disclosure, if the first target binary matrix and the second target binary matrix are $N_1 \times N_2$ matrices, if the first target binary matrix is f(x,y) and the second target binary matrix is g(x,y), where x=−$M_1$, . . . , $M_1$($M_1$>0), y=−$M_2$, . . . , $M_2$($M_2$>0), then $N_1$=2$M_1$+1, $N_2$=2$M_2$+1. F($k_1$,$k_2$) and G($k_1$,$k_2$) are respectively two-dimensional DFT of f(x,y) and g(x,y), the definition is as follows:

$$F(k_1, k_2) = \sum_{x,y} f(x, y) W_{N_1}^{k_1 x} W_{N_2}^{k_2 y} = A_F(k_1, k_2) e^{j\theta_F(k_1, k_2)},$$

$$G(k_1, k_2) = \sum_{x,y} g(x, y) W_{N_1}^{k_1 x} W_{N_2}^{k_2 y} = A_G(k_1, k_2) e^{j\theta_G(k_1, k_2)},$$

Where $k_1$=−$M_1$, . . . , $M_1$; $k_2$=−$M_2$, . . . , $M_2$; $W_{N_1}$=$e^{-j2\pi/N_1}$; $W_{N_2}$=$e^{-j2\pi/N_2}$; $A_F(k_1,k_2)$ and $A_G(k_1,k_2)$ are amplitudes; and $\theta_F(k_1,k_2)$ and $\theta_G(k_1,k_2)$ are phases.

In step S103, an offset of the second image with respect to the first image is acquired according to the first Fourier matrix and the second Fourier matrix.

In the embodiments of the present disclosure, after acquiring the first Fourier matrix and the second Fourier matrix, an offset of the second image with respect to the first image will be acquired according to the first Fourier matrix and the second Fourier matrix.

In the embodiments of the present disclosure, the acquiring of an offset of the second image with respect to the first image according to the first Fourier matrix and the second Fourier matrix can include steps of: 31) point multiplying a conjugate matrix of the second Fourier matrix with the first Fourier matrix to acquire a point multiplying matrix; 32) performing a two-dimensional inverse DFT to the point multiplying matrix to acquire an inverse transforming matrix; 33) performing an overall swap of elements in a first quadrant and elements in a third quadrant of the inverse transforming matrix with a center of the inverse transforming matrix as an origin, a horizontal direction as an x axis and a vertical direction as a y axis, and performing an overall swap of elements in a second quadrant and elements in a forth quadrant of the inverse transforming matrix, so as to acquire a target matrix; and 34) acquiring a coordinate of a maximal value in the target matrix as a target coordinate, and regarding a difference between the target coordinate and the center coordinate of the target matrix as an offset of the second image with respect to the first image.

In the foregoing examples of embodiments, if there is a linear correlative displacement ($x_0$,$y_0$) variation of the first target binary matrix f(x,y) and the second target binary matrix g(x,y), i.e., f(x,y)=g(x−$x_0$,y−$y_0$), then the Fourier transform relation therebetween is $F(k_1,k_2)$=$e^{-j2\pi(k_1 x_0 + k_2 y_0)}$G($k_1$,$k_2$), F($k_1$,$k_2$) and G($k_1$,$k_2$) are two-dimensional DFT of f(x,y) and g(x,y).

In the present embodiment, the formula for point multiplying the conjugate matrix of the second Fourier matrix with the first Fourier matrix is $R_{GF}(k_1,k_2)$=F($k_1$,$k_2$)·G*($k_1$,$k_2$)=$e^{-j2\pi(k_1 x_0 + k_2 y_0)}$, $R_{GF}(k_1,k_2)$ is the point multiplying matrix, and G*($k_1$,$k_2$) is the conjugate matrix of the second Fourier matrix.

In the present embodiment, if $R_{GF}(k_1,k_2)$ is the matrix of $N_1 \times N_2$, the formula for the device of correcting a single-molecule image to perform the two-dimensional inverse DFT to the point multiplying matrix is $$P_{gf}(m, n) = \frac{1}{N_1 N_2} \sum_{k_2=0}^{N_2-1} \sum_{k_1=0}^{N_1-1} R_{GF}(k_1, k_2) e^{-j2\pi(mk_1/N_1 + nk_2/N_2)}, \text{ and } P_{gf}(m, n)$$

is the inverse transforming matrix.

In the present embodiment, after acquiring the inverse transforming matrix, an overall swap of elements in a first quadrant and elements in a third quadrant of the inverse transforming matrix with a center of the inverse transforming matrix as an origin, a horizontal direction as an x axis and a vertical direction as a y axis will be performed, and an overall swap of elements in a second quadrant and elements in a forth quadrant of the inverse transforming matrix is performed, so as to acquire a target matrix.

For example, if the inverse transforming matrix is $$P_{gf} = \begin{bmatrix} 1 & 2 & 3 & 4 \\ 5 & 6 & 7 & 8 \\ 9 & 10 & 11 & 12 \\ 13 & 14 & 15 & 16 \end{bmatrix},$$

then the target matrix acquired is $$X = \begin{bmatrix} 11 & 12 & 9 & 10 \\ 15 & 16 & 13 & 14 \\ 3 & 4 & 1 & 2 \\ 7 & 8 & 5 & 6 \end{bmatrix}.$$

In the present embodiment, after acquiring the target matrix, a coordinate of a maximal value in the target matrix is acquired and regarded as a target coordinate, and a difference between the target coordinate and the center coordinate of the target matrix is calculated and regarded as an offset of the second image with respect to the first image. For example, if the target coordinate is (2,3), the center coordinate is (2,2), then the offset of the second image with respect to the first image is (0,1).

In step S104, the second image is corrected according to the offset.

In the embodiments of the present disclosure, after acquiring the offset of the second image with respect to the first image, the second image is corrected according to the offset acquired.

Figure 2:
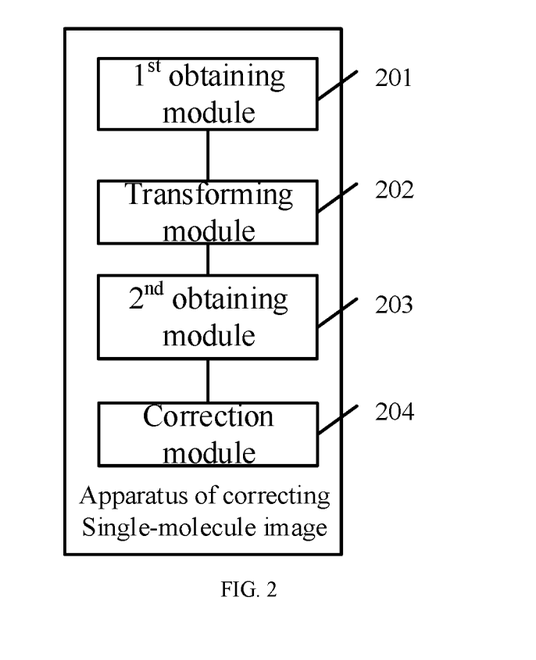
FIG. 2 is a schematic diagram of a device of correcting a single-molecule image according to an embodiment.

Referring to FIG. 2, which is a schematic diagram of a device of correcting a single-molecule image according to an embodiment. The device of correcting a single-molecule image illustrated in FIG. 2 can include a first acquiring module 201, a transforming module 202, a second acquiring module 203 and a correction module 204. The first acquiring module 201 is configured to acquire a first target simplified matrix corresponding to a first image according to an intensity matrix corresponding to each of pixels in the first image, and acquire a second target simplified matrix corresponding to a second image according to an intensity matrix corresponding to each of the pixels in the second image.

In the embodiments of the present disclosure, the first acquiring module 201 acquires the first target simplified matrix corresponding to the first image according to the intensity matrix corresponding to each of the pixels in the first image, and the second target simplified matrix corresponding to the second image according to the intensity matrix corresponding to each of the pixels in the second image. The device of correcting a single-molecule image is not limited to the smart phone, the tablet, the notebook computer, the desktop computer or other user equipment. The operating system (OS) of the device of correcting a single-molecule image is not limited to the Android OS, the IOS OS, the Symbian OS, the Black Berry OS, the Windows OS and so on, there is no limitation in the embodiments of the present disclosure in this respect.

In the embodiments of the present disclosure, the first image is the image taken at a first point of time, the second image is the image taken at a second point of time, the second point of time is later than the first point of time. When a user intends to correct a difference between the first image and the second image, the user can import the first image and the second image into the device of correcting a single-molecule image.

After reading the first image and the second image, the device of correcting a single-molecule image will, with respect to each of pixels of the first image, determine an intensity matrix corresponding to each of the pixels of the first image, and with respect to each of the pixels of the second image, determine an intensity matrix corresponding to each of the pixels of the second image. The intensity matrix corresponding to each of the pixels is a matrix with the intensity of such pixel as the center and having intensity of pixels of a preset number of rows and a preset number of columns. For example, the intensity matrix corresponding to a pixel can be a 3*3, 5*5, 7*7 matrix with the intensity of such pixel as the center, there is no limitation in the embodiments of the present disclosure in this respect.

Taking the first image as an example, in the case there are 512*512 pixels in the first image, 512*512 intensity matrices will be determined in total by the device of correcting a single-molecule image. As shown in FIG. 5, FIG. 5 is a schematic diagram of the distribution of the pixels of the first image, n is 512, $a_{11}$ is a pixel at the first row and first column, $a_{12}$ is a pixel at the first row and the second column, $a_{1n}$ is a pixel at the first row and the column n . . . and $a_{nn}$ is a pixel at row n and column n. If the intensity matrix is a 3*3 matrix, 3*3 pixels with $a_{11}$ as the center are selected from the first image when the intensity matrix corresponding to $a_{11}$ is determined by the device of correcting a single-molecule image. 3*3 pixels with $a_{11}$ as the center and among the pixels of the first image only includes $a_{12}$, $a_{21}$, and $a_{22}$, intensity of $a_{11}$, $a_{12}$, $a_{21}$, and $a_{22}$ will be acquired by the device of correcting a single-molecule image, and intensity of 3*3 pixels with $a_{11}$ as the center that do not present in the pixels of the first image are set up to be 0; intensity of 3*3 pixels with $a_{11}$ as the center form an intensity matrix corresponding to a11.

For example, if the intensity corresponding to $a_{11}$ is $L_{11}$, the intensity corresponding to $a_{12}$ is $L_{12}$, the intensity corresponding to $a_{21}$ is $L_{21}$, the intensity corresponding to $a_{22}$ is $L_{22}$, then the intensity matrix $A_{11}$ corresponding to $a_{11}$ is $$A_{11} = \begin{bmatrix} 0 & 0 & 0 \\ 0 & L_{11} & L_{12} \\ 0 & L_{21} & L_{22} \end{bmatrix},$$

likewise, the intensity matrix $A_{12}$ corresponding to $a_{12}$ is $$A_{12} = \begin{bmatrix} 0 & 0 & 0 \\ L_{11} & L_{12} & L_{13} \\ L_{21} & L_{22} & L_{23} \end{bmatrix},$$

$L_{13}$ is the intensity of $a_{13}$, and $L_{23}$ is the intensity of $a_{23}$. Similarly, the intensity matrix $A_{22}$ corresponding to $a_{22}$ is $$A_{22} = \begin{bmatrix} L_{11} & L_{12} & L_{13} \\ L_{21} & L_{22} & L_{23} \\ L_{31} & L_{32} & L_{33} \end{bmatrix},$$

$L_{31}$ is the intensity of $a_{31}$, $L_{32}$ is the intensity of $a_{32}$, and $L_{33}$ is the intensity of $a_{33}$.

The principle of the device of correcting a single-molecule image to determine the intensity matrix corresponding to each of the pixels of the second image is the same to the principle to determine the intensity matrix corresponding to each of the pixels of the first image, and is thus omitted for brevity.

As an optional embodiment, the first target simplified matrix and the second target simplified matrix are both binary matrices.

In the embodiments of the present disclosure, after the device of correcting a single-molecule image determined the intensity matrix corresponding to each of the pixels of the first image and the intensity matrix corresponding to each of the pixels of the second image, the first acquiring module 201 acquires the first target simplified matrix corresponding to the first image according to the intensity matrix corresponding to each of the pixels in the first image, and the second target simplified matrix corresponding to the second image according to the intensity matrix corresponding to each of the pixels in the second image.

The transforming module 202 is configured to perform a two-dimensional DFT to the first target simplified matrix and the second target simplified matrix respectively to acquire a first Fourier matrix corresponding to the first target simplified matrix and a second Fourier matrix corresponding to the second target simplified matrix.

As an example, the first target simplified matrix and the second target simplified matrix are described as a binary matrix as follows, other simplified matrix can be understood with reference to the following.

In the embodiments of the present disclosure, if the first target $f(x,y)$ binary matrix and the second target binary matrix are $N_1 \times N_2$ matrices, and if the first target binary matrix is $f(x,y)$ and the second target binary matrix is $g(x,y)$, where $x=-M_1, \ldots, M_1(M_1>0)$, $y=-M_2, \ldots, M_2(M_2>0)$, then $N_1=2M_1+1$, $N_2=2M_2+1$. $F(k_1,k_2)$ and $G(k_1,k_2)$ are respectively two-dimensional DFT of $f(x,y)$ and $g(x,y)$, the definition is as follows:

$$F(k_1, k_2) = \sum_{x,y} f(x, y) W_{N_1}^{k_1 x} W_{N_2}^{k_2 y} = A_F(k_1, k_2) e^{j\theta_F(k_1, k_2)},$$

$$G(k_1, k_2) = \sum_{x,y} g(x, y) W_{N_1}^{k_1 x} W_{N_2}^{k_2 y} = A_G(k_1, k_2) e^{j\theta_G(k_1, k_2)},$$

Where $k_1=-M_1, \ldots, M_1$; $k_2=-M_2, \ldots, M_2$; $W_{N_1}=e^{-j2\pi/N_1}$; $W_{N_2}=e^{-j2\pi/N_2}$; $A_F(k_1,k_2)$ and $A_G(k_1,k_2)$ are amplitudes; and $\theta_F(k_1,k_2)$ and $\theta_G(k_1,k_2)$ are phases.

The second acquiring module 203 is configured to acquire an offset of the second image with respect to the first image according to the first Fourier matrix and the second Fourier matrix.

In the embodiments of the present disclosure, after the transforming module 202 acquired the first Fourier matrix and the second Fourier matrix, an offset of the second image with respect to the first image will be acquired by the second acquiring module 203 according to the first Fourier matrix and the second Fourier matrix.

The correction module 204 is configured to correct the second image according to the offset.

In the embodiments of the present disclosure, after the second acquiring module 203 acquired the offset of the second image with respect to the first image, the second image is corrected by the correction module 204 according to the offset acquired.

Figure 3:
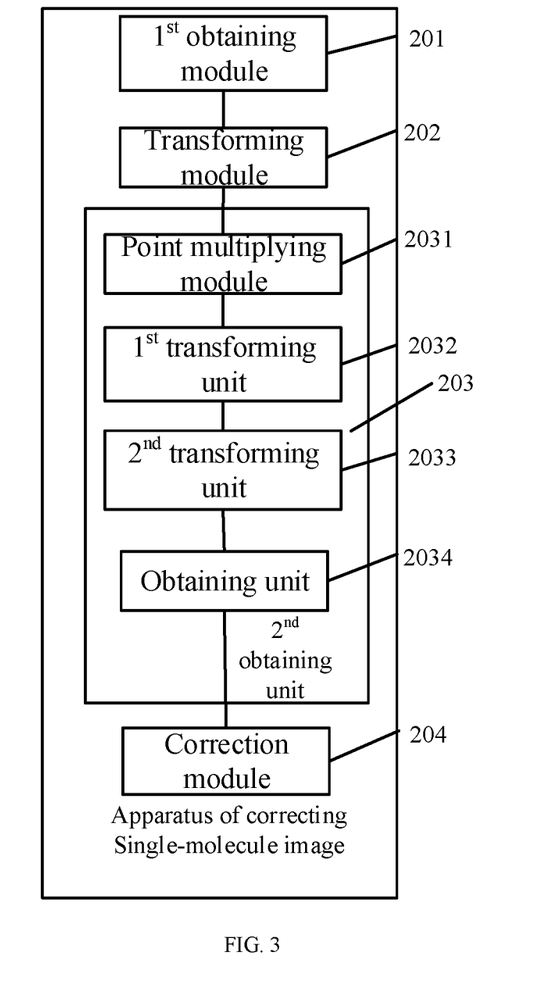
FIG. 3 is a schematic diagram of another device of correcting a single-molecule image according to an embodiment.

Referring also to FIG. 3, which is a schematic diagram of another device of correcting a single-molecule image according to an embodiment. The device of correcting a single-molecule image shown in FIG. 3 is optimized from the device of correcting a single-molecule image shown in FIG. 2. Compared with the device of correcting a single-molecule image shown in FIG. 2, the device of correcting a single-molecule image in FIG. 3 includes all modules of the device of correcting a single-molecule image shown in FIG. 2, the second acquiring module 203 can include a point multiplying unit 2031, a first transforming unit 2032, a second transforming unit 2033, and an acquiring unit 2034, where:

The point multiplying unit 2031 is configured to point multiplying a conjugate matrix of the second Fourier matrix with the first Fourier matrix to acquire a point multiplying matrix.

In the foregoing examples of embodiments, if there is a linear correlative displacement $(x_0,y_0)$ variation of the first target binary matrix $f(x,y)$ and the second target binary matrix $g(x,y)$, i.e., $f(x,y)=g(x-x_0,y-y_0)$, then the Fourier transform relation therebetween is $F(k_1,k_2)=e^{-j2\pi(k_1 x_0+k_2 y_0)}G(k_1,k_2)$, $F(k_1,k_2)$ and $G(k_1,k_2)$ are two-dimensional DFT of $f(x,y)$ and $g(x,y)$.

In the present embodiment, the formula for point multiplying the conjugate matrix of the second Fourier matrix with the first Fourier matrix is $R_{GF}(k_1,k_2)=F(k_1,k_2)=G^*(k_1,k_2)=e^{-j2\pi(k_1 x_0+k_2 y_0)}$, $R_{GF}(k_1,k_2)$ is the point multiplying matrix, and $G^*(k_1,k_2)$ is the conjugate matrix of the second Fourier matrix.

The first transforming unit 2032 is configured to perform the two-dimensional inverse DFT to the point multiplying matrix to acquire an inverse transforming matrix;

In the present embodiment, if $R_{GF}(k_1,k_2)$ is the $N_1 \times N_2$ matrix, the formula for the first transforming unit 2032 to perform the two-dimensional inverse DFT to the point multiplying matrix is $$P_{gf}(m, n) = \frac{1}{N_1 N_2} \sum_{k_2=0}^{N_2-1} \sum_{k_1=0}^{N_1-1} R_{GF}(k_1, k_2) e^{-j2\pi(mk_1/N_1 + nk_2/N_2)}, \text{ and } P_{gf}(m, n)$$

is the inverse transforming matrix.

The second transforming unit 2033 is configured to perform an overall swap of elements in a first quadrant and elements in a third quadrant of the reverse transform matrix with a center of the reverse transform matrix as an origin, a horizontal direction as an x axis and a vertical direction as a y axis, and performing an overall swap of elements in a second quadrant and elements in a forth quadrant of the reverse transform matrix, so as to acquire a target matrix.

In the embodiments of the present disclosure, after acquiring the inverse transforming matrix by the first transforming unit 2032, an overall swap of elements in a first quadrant and elements in a third quadrant of the inverse transforming matrix with a center of the inverse transforming matrix as an origin, a horizontal direction as an x axis and a vertical direction as a y axis will be performed, as well as an overall swap of elements in a second quadrant and elements in a forth quadrant of the inverse transforming matrix is performed by the second transforming unit 2033, so as to acquire a target matrix.

For example, if the inverse transforming matrix is $$P_{gf} = \begin{bmatrix} 1 & 2 & 3 & 4 \\ 5 & 6 & 7 & 8 \\ 9 & 10 & 11 & 12 \\ 13 & 14 & 15 & 16 \end{bmatrix},$$

then the target matrix acquired is $$X = \begin{bmatrix} 11 & 12 & 9 & 10 \\ 15 & 16 & 13 & 14 \\ 3 & 4 & 1 & 2 \\ 7 & 8 & 5 & 6 \end{bmatrix}.$$

The acquiring unit 2034 is configured to acquire a coordinate of a maximal value in the target matrix as a target coordinate, and regarding a difference between the target coordinate and the center coordinate of the target matrix as an offset of the second image with respect to the first image.

In the embodiments of the present disclosure, after acquiring the target matrix by the second transforming unit 2033, a coordinate of a maximal value in the target matrix is acquired and regarded as a target coordinate by the acquiring unit 2034, and a difference between the target coordinate and the center coordinate of the target matrix is calculated and regarded as an offset of the second image with respect to the first image by the acquiring unit 2034. For example, if the target coordinate is (2,3), the center coordinate is (2,2), then the offset of the second image with respect to the first image is (0,1).

Figure 4:
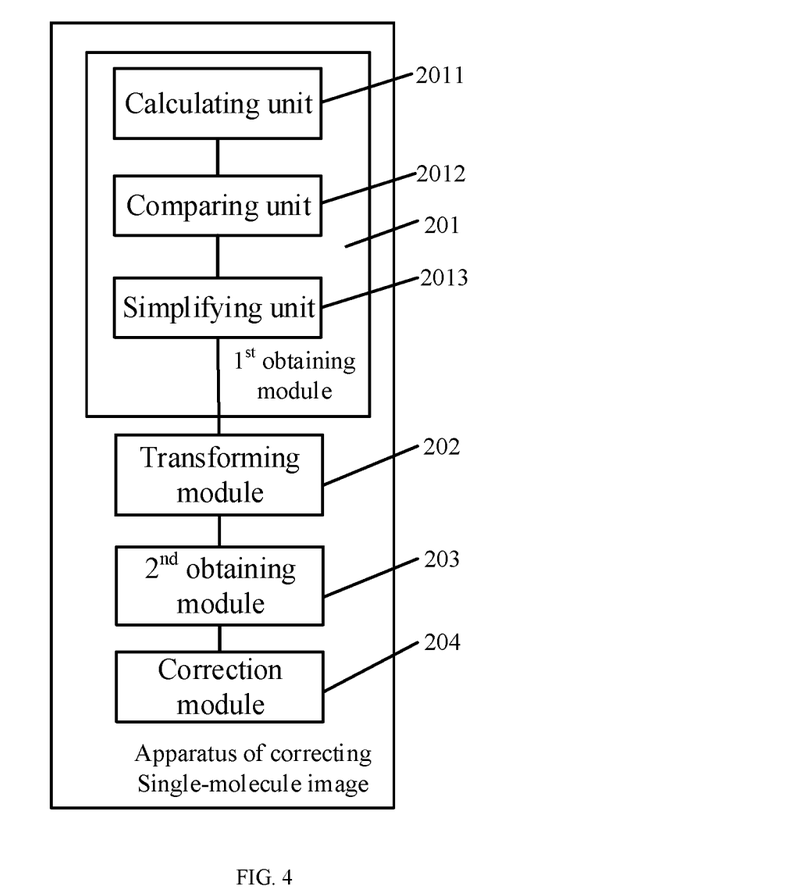
FIG. 4 is a schematic diagram of another device of correcting a single-molecule image according to an embodiment.

Referring also to FIG. 4, which is a schematic diagram of another device of correcting a single-molecule image according to an embodiment. The device of correcting a single-molecule image shown in FIG. 4 is optimized from the device of correcting a single-molecule image shown in FIG. 2. Compared with the device of correcting a single-molecule image shown in FIG. 2, the device of correcting a single-molecule image in FIG. 4 includes all modules of the device of correcting a single-molecule image shown in FIG. 2, the first acquiring module 201 can include a computing unit 2011, a comparing unit 2012, a simplifying unit 2013 and an acquiring unit 2013, where:

The calculating unit 2011 is configured to calculate a similarity value of an intensity matrix corresponding to each of the pixels of the first image and a preset matrix to acquire a first similarity value matrix.

The comparing unit 2012 is configured to compare each of the similarity values in the first similarity value matrix with a preset threshold value to acquire comparison results corresponding to each of the similarity values in the first similarity value matrix;

The simplifying unit 2013 is configured to classify each of the similarity values in the first similarity value matrix according to the comparison results corresponding to each of the similarity values in the first similarity value matrix to acquire a first target simplified matrix corresponding to the first image.

In the embodiments of the present disclosure, a preset matrix is preset by the device of correcting a single-molecule image, which has the same number of rows and number of columns with the intensity matrix, and the element of the preset matrix are intensity. After the intensity matrix corresponding to each of the pixels of the first image is determined, with respect to each intensity matrix, the calculating unit 2011 will calculate the similarity value of an intensity matrix and a preset matrix, and regard all similarity values acquired as elements of the matrix to form a first similarity value matrix. The particular embodiment to acquire the similarity of the two matrices are known in the art and is therefore omitted for brevity.

For example, when the first image has 512*512 pixels, as shown in FIG. 5, n is 512, $a_{11}$ is a pixel at the first row and first column, $a_{12}$ is a pixel at the first row and the second column, $a_{1n}$ is a pixel at the first row and column n . . . and $a_{nn}$ is a pixel at row n and column n. If the similarity value corresponding to $a_{11}$ is $S_{11}$, the similarity value corresponding to $a_{11}$ is $S_{11}$, the similarity value corresponding to a12 is $S_{12}$ . . . the similarity value corresponding to $a_{1n}$ is $S_{1n}$, then the similarity value matrix $$S = \begin{bmatrix} S_{11} & \cdots & S_{1n} \\ \cdots & \cdots & \cdots \\ S_{n1} & \cdots & S_{nn} \end{bmatrix}.$$

In this embodiment, a preset threshold is preset by the device of correcting a single-molecule image, for example, the preset threshold can be a value greater than 0 and less than 1, there is no limitation in that respect in the embodiments of the present disclosure. The comparing unit 2012 compares each of the similarity values in the first similarity value matrix with a preset threshold value to acquire comparison results corresponding to each of the similarity values. Such comparison result can be that the similarity value is greater than the preset threshold, the similarity value is equal to the preset threshold, or the similarity value is less than the preset threshold. The simplifying unit 2013 classifies each of the similarity values in the first similarity value matrix according to the comparison results to acquire the simplified matrix of the target image.

As an optional embodiment, the simplifying unit 2013 classifies each of the similarity values in the first similarity value matrix according to the comparison results corresponding to each of the similarity values in the first similarity value matrix to acquire a first target simplified matrix corresponding to the first image particularly by:

with respect to each of the similarity values in the first similarity value matrix, when the comparison result corresponding to the similarity value is that the similarity value is greater or equal to the preset threshold, classifying the similarity value as a first class, and when the comparison result corresponding to the similarity value is that the similarity value is less than the preset threshold, classifying the similarity value as a second class, so as to acquire a first target simplified matrix corresponding to the first image.

For example, in certain embodiments, when the first target simplified matrix is a binary matrix and when the comparison result corresponding to the similarity value is greater or equal to the preset threshold, the similarity value is classified as 1 (a first class), and when the comparison result corresponding to the similarity value is that the similarity value is less than the preset threshold, the similarity value is classified as 0 (a second class), so as to acquire a first target binary matrix corresponding to the first image.

It should be noted that, in a particular embodiment, the first class can be understood as the image pixels corresponding to the first class are image pixels required in locating single molecules, a second class can be understood as the image pixels corresponding to the first class are image pixels not required in locating single molecules, which are pixels can be removed or ignored in an image processing process.

As an example, the first target simplified matrix is described as a binary matrix as follows, other simplified matrix can be understood with reference to the following.

In the example of the embodiment, for a 3*3 first similarity value matrix, if S11~S13, S21~S23 are similarity values greater or equal to the preset threshold, and S31~S33 are similarity values less than the preset threshold, a binary matrix $$X = \begin{bmatrix} 1 & 1 & 1 \\ 1 & 1 & 1 \\ 0 & 0 & 0 \end{bmatrix}$$

is acquired.

As an optional embodiment, the calculating unit 2011 is further configured to calculate a similarity value of an intensity matrix corresponding to each of the pixels of the first image and the preset matrix to acquire a second similarity value matrix;

The comparing unit 2012 is further configured to compare each of the similarity values in the second similarity value matrix with the preset threshold value to acquire comparison results corresponding to each of the similarity values in the second similarity value matrix.

The simplification unit 2013 is further configured to classify each of the similarity values in the second similarity value matrix according to the comparison results corresponding to each of the similarity values in the second similarity value matrix to acquire a second target simplified matrix corresponding to the second image.

In this embodiment, the implementing principle by the calculating unit 2011 to acquire the second similarity value matrix is the same as that of acquiring the first similarity value matrix by the calculating unit 2011; the implementing principle by the comparing unit 2012 to acquire the comparing results corresponding to each of similarity values in the second similarity value matrix is the same as that of acquiring the comparing results corresponding to each of similarity values in the first similarity value matrix by the comparing unit 2012; the implementing principle by the simplifying unit 2013 to acquire the second target simplifying matrix corresponding to the second image is the same as that of acquiring the first target simplifying matrix corresponding to the first image by the simplifying unit 2013, which are omitted for brevity.

As an optional embodiment, the simplifying unit 2013 classifies each of the similarity values in the second similarity value matrix according to the comparison results corresponding to each of the similarity values in the second similarity value matrix to acquire a second target simplified matrix corresponding to the second image particularly by:

with respect to each of the similarity values in the second similarity value matrix, when the comparison result corresponding to the similarity value is that the similarity value is greater or equal to the preset threshold, classifying the similarity value as a first class, and when the comparison result corresponding to the similarity value is that the similarity value is less than the preset threshold, classifying the similarity value as a second class, so as to acquire a second target simplified matrix corresponding to the second image.

For example, in certain embodiments, when the second target simplified matrix is a binary matrix and when the comparison result corresponding to the similarity value is greater or equal to the preset threshold, the similarity value is classified as 1 (a first class), and when the comparison result corresponding to the similarity value is that the similarity value is less than the preset threshold, the similarity value is classified as 0 (a second class), so as to acquire a second target binary matrix corresponding to the second image.

As an example, the second target simplified matrix is described as a binary matrix as follows, other simplified matrix can be understood with reference to the following.

In the example of the embodiment, for a 3*3 second similarity value matrix, if S11~S13, S21~S23 are similarity values greater or equal to the preset threshold, and S31~S33 are similarity values less than the preset threshold, a binary matrix $$X = \begin{bmatrix} 1 & 1 & 1 \\ 1 & 1 & 1 \\ 0 & 0 & 0 \end{bmatrix}$$

is acquired.

In the device of correcting a single-molecule image described in FIGS. 2-4, after the first acquiring module acquired the first target simplified matrix corresponding to the first image according to the intensity matrix corresponding to each of pixels in the first image, and acquired the second target simplified matrix corresponding to the second image according to the intensity matrix corresponding to each of the pixels in the second image; the transforming module performs the two-dimensional DFT to the first target simplified matrix and the second target simplified matrix respectively to acquire the first Fourier matrix corresponding to the first target simplified matrix and the second Fourier matrix corresponding to the second target simplified matrix; the second acquiring module acquires the offset of the second image with respect to the first image according to the first Fourier matrix and the second Fourier matrix; and the correction module corrects the second image according to the offset. As such, the embodiments of the present disclosure can correct the images of single molecules taken at different moments.

It should understood that in the foregoing embodiments, the descriptions of different embodiments have different emphasis, a part that is not described in detail in an embodiment can be referred in descriptions in other embodiments. Also, a person skilled in the art should also understood, the embodiments described in the specification are preferred embodiments, the operations and modules involved therein are not necessarily required in the present disclosure.

The steps in the embodiments of the present disclosure can be adjusted in sequence, merged or omitted in view of the actual demand.

The modules or units in the device of correcting a single-molecule image according to the embodiments of the present disclosure can be merged, divided and omitted in view of the actual demand.

Figure 6:
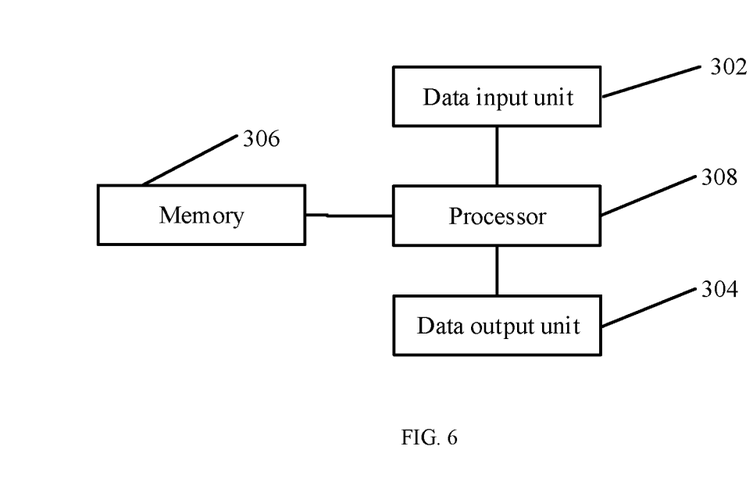
FIG. 6 is a schematic diagram of a system of correcting a single-molecule image according to an embodiment.

Referring to FIG. 6, a system of correcting a single-molecule image is disclosed in the embodiments of the present disclosure, which includes: a data input unit 302 configured to input data; a data output unit 304 configured to output data; a memory 306 configured to store data, the data comprises a computer-readable program; a processor 308 configured to execute the computer-readable program, the execution of the computer-readable program includes completing methods according to either one of the foregoing methods. As such, the embodiments of the present disclosure can correct the images of single molecules taken at different moments.

The embodiments of the present disclosure discloses a computer-readable storage medium configured to store a program for a computer to execute, the execution of the program comprises completing methods according to either one of the foregoing correcting a single-molecule image methods. As such, the embodiments of the present disclosure can correct the images of single molecules taken at different moments.

A person skilled in the art can understand that all or part of the steps in the various methods in the foregoing embodiments can be completed by programs instructing hardware related to terminal equipment, the program can be stored in a computer-readable medium which includes: a flash disk, a Read-Only Memory (ROM), a Random Access Memory (RAM), a diskette or a CD etc.

Although the method and device of correcting a single-molecule image is illustrated and described herein with reference to specific embodiments, the invention is not intended to be limited to the foregoing embodiments which are introduced for the purpose of explaining the methodology and idea thereof. In the meanwhile, various modifications may be made by a person skilled in the art in the details within the scope and range of equivalents of the claims without departing from the invention. As such, the description of the specification is not supposed to limit the invention.

What is claimed is:

1. A method of correcting a single-molecule image, comprising:
acquiring a first target simplified matrix corresponding to a first image according to an intensity matrix corresponding to each of pixels of the first image;
acquiring a second target simplified matrix corresponding to a second image according to the intensity matrix corresponding to each of the pixels of the second image;
wherein the intensity matrix corresponding to each of the pixels is a matrix with the intensity of such pixel as a center and having intensity of pixels of a preset number of rows and a preset number of columns;
performing a two-dimensional discrete Fourier transform (DFT) to the first target simplified matrix and the second target simplified matrix respectively to acquire a first Fourier matrix corresponding to the first target simplified matrix and a second Fourier matrix corresponding to the second target simplified matrix;
acquiring an offset of the second image with respect to the first image according to the first Fourier matrix and the second Fourier matrix; and
correcting the second image according to the offset.

2. A method as claimed in claim 1, wherein the first target simplified matrix and the second target simplified matrix are both binary matrices.

3. A method as claimed in claim 1, wherein the acquiring the offset of the second image with respect to the first image according to the first Fourier matrix and the second Fourier matrix comprises:
point multiplying a conjugate matrix of the second Fourier matrix with the first Fourier matrix to acquire a point multiplying matrix;
performing a two-dimensional inverse DFT to the point multiplying matrix to acquire an inverse transforming matrix;
using a center of the inverse transforming matrix as an origin, a horizontal direction as an x axis and a vertical direction as a y axis, performing an overall swap of elements in a first quadrant and elements in a third quadrant of the inverse transforming matrix, and performing an overall swap of elements in a second quadrant and elements in a fourth quadrant of the inverse transforming matrix, so as to acquire a target matrix; and
acquiring a coordinate of a maximal value in the target matrix as a target coordinate, and regarding a difference between the target coordinate and a center coordinate of the target matrix as the offset of the second image with respect to the first image.

4. A method as claimed in claim 1, wherein the acquiring the first target simplified matrix corresponding to the first image according to the intensity matrix corresponding to each of the pixels of the first image comprises:
calculating a similarity value of an intensity matrix corresponding to each of the pixels of the first image and a preset matrix to acquire a first similarity value matrix;
comparing each of similarity values in the first similarity value matrix with a preset threshold value to acquire comparison results corresponding to each of the similarity values in the first similarity value matrix; and
classifying each of the similarity values in the first similarity value matrix according to the comparison result corresponding to each of the similarity values in the first similarity value matrix to acquire a first target simplified matrix corresponding to the first image.

5. A method as claimed in claim 4, wherein the acquiring the second target simplified matrix corresponding to the second image according to the intensity matrix corresponding to each of the pixels of the second image comprises:
calculating the similarity value of the intensity matrix corresponding to each of the pixels of the second image and the preset matrix to acquire a second similarity value matrix;
comparing each of the similarity values in the second similarity value matrix with the preset threshold value to acquire comparison results corresponding to each of the similarity values in the second similarity value matrix; and
classifying each of the similarity values in the second similarity value matrix according to the comparison result corresponding to each of the similarity values in the second similarity value matrix to acquire a second target simplified matrix corresponding to the second image.

6. A method as claimed in claim 5, wherein the classifying each of the similarity values in the first similarity value matrix according to the comparison result corresponding to each of the similarity values in the first similarity value matrix to acquire the first target simplified matrix corresponding to the first image comprises:
with respect to each of the similarity values in the first similarity value matrix, when the comparison result corresponding to the similarity value is that the similarity value is greater or equal to the preset threshold, classifying the similarity value as a first class, and when the comparison result corresponding to the similarity value is that the similarity value is less than the preset threshold, classifying the similarity value as a second class, so as to acquire a first target simplified matrix corresponding to the first image.

7. A method as claimed in claim 6, wherein the classifying each of the similarity values in the second similarity value matrix according to the comparison results corresponding to each of the similarity values in the second similarity value matrix to acquire the second target simplified matrix corresponding to the second image comprises:

with respect to each of the similarity values in the second similarity value matrix, when the comparison result corresponding to the similarity value is that the similarity value is greater or equal to the preset threshold, classifying the similarity value as the first class, and when the comparison result corresponding to the similarity value is that the similarity value is less than the preset threshold, classifying the similarity value as the second class, so as to acquire a second target simplified matrix corresponding to the second image.

8. A device of correcting a single-molecule image, comprising:

a first acquiring module configured to acquire a first target simplified matrix corresponding to a first image according to an intensity matrix corresponding to each of pixels in the first image, and acquire a second target simplified matrix corresponding to a second image according to an intensity matrix corresponding to each of the pixels in the second image, wherein the intensity matrix corresponding to each of the pixels is a matrix with the intensity of such pixel as the center and having intensity of pixels of a preset number of rows and a preset number of columns;

a transforming module configured to perform a two-dimensional DFT to the first target simplified matrix and the second target simplified matrix respectively to acquire a first Fourier matrix corresponding to the first target simplified matrix and a second Fourier matrix corresponding to the second target simplified matrix;

a second acquiring module configured to acquire an offset of the second image with respect to the first image according to the first Fourier matrix and the second Fourier matrix; and a correction module configured to correct the second image according to the offset.

9. A device as claimed in claim 8, wherein the first target simplified matrix and the second target simplified matrix are both binary matrices.

10. A device as claimed in claim 8, wherein the second acquiring module further comprises:

a point multiplying unit configured to point multiplying a conjugate matrix of the second Fourier matrix with the first Fourier matrix to acquire a point multiplying matrix;

a first transforming unit configured to perform a two-dimensional inverse DFT to the point multiplying matrix to acquire an inverse transforming matrix;

a second transforming unit configured to perform an overall swap of elements in a first quadrant and elements in a third quadrant of the inverse transforming matrix with a center of the inverse transforming matrix as an origin, a horizontal direction as an x axis and a vertical direction as a y axis, and performing an overall swap of elements in a second quadrant and elements in a forth quadrant of the inverse transforming matrix, so as to acquire a target matrix; and an acquiring unit configured to acquire a coordinate of a maximal value in the target matrix as a target coordinate, and regarding a difference between the target coordinate and the center coordinate of the target matrix as the offset of the second image with respect to the first image.

11. A device as claimed in claim 8, wherein the first acquiring module comprises:

a calculating unit configured to calculate a similarity value of an intensity matrix corresponding to each of the pixels of the first image and a preset matrix to acquire a first similarity value matrix;

a comparing unit configured to compare each of the similarity values in the first similarity value matrix with a preset threshold value to acquire comparison results corresponding to each of the similarity values in the first similarity value matrix; and a simplifying unit configured to classify each of the similarity values in the first similarity value matrix according to the comparison results corresponding to each of the similarity values in the first similarity value matrix to acquire a first target simplified matrix corresponding to the first image.

12. A device as claimed in claim 11, wherein the calculating unit is further configured to calculate a similarity value of an intensity matrix corresponding to each of the pixels of the first image and the preset matrix to acquire a second similarity value matrix;

the comparing unit is further configured to compare each of the similarity values in the second similarity value matrix with the preset threshold value to acquire comparison results corresponding to each of the similarity values in the second similarity value matrix; and the simplification unit is further configured to classify each of the similarity values in the second similarity value matrix according to the comparison results corresponding to each of the similarity values in the second similarity value matrix to acquire a second target simplified matrix corresponding to the second image.

13. A device as claimed in claim 12, wherein the simplifying unit classifies each of the similarity values in the first similarity value matrix according to the comparison results corresponding to each of the similarity values in the first similarity value matrix to acquire the first target simplified matrix corresponding to the first image particularly by:

with respect to each of the similarity values in the first similarity value matrix, when the comparison result corresponding to the similarity value is that the similarity value is greater or equal to the preset threshold, classifying the similarity value as a first class, and when the comparison result corresponding to the similarity value is that the similarity value is less than the preset threshold, classifying the similarity value as a second class, so as to acquire a first target simplified matrix corresponding to the first image.

14. A device as claimed in claim 13, wherein the simplifying unit classifies each of the similarity values in the second similarity value matrix according to the comparison results corresponding to each of the similarity values in the second similarity value matrix to acquire the second target simplified matrix corresponding to the second image particularly by:

with respect to each of the similarity values in the second similarity value matrix, when the comparison result corresponding to the similarity value is that the similarity value is greater or equal to the preset threshold, classifying the similarity value as the first class, and when the comparison result corresponding to the similarity value is that the similarity value is less than the preset threshold, classifying the similarity value as the second class, so as to acquire a second target simplified matrix corresponding to the second image.

15. A computer program product comprising a non-transitory computer-readable storage medium storing a program, which when the program is executed by the computer, causes the computer to carry out the steps of the method of claim 1.

16. A method as claimed in claim 3, wherein the acquiring the first target simplified matrix corresponding to the first image according to the intensity matrix corresponding to each of the pixels of the first image comprises:
   calculating a similarity value of an intensity matrix corresponding to each of the pixels of the first image and a preset matrix to acquire a first similarity value matrix;
   comparing each of similarity values in the first similarity value matrix with a preset threshold value to acquire comparison results corresponding to each of the similarity values in the first similarity value matrix; and
   classifying each of the similarity values in the first similarity value matrix according to the comparison result corresponding to each of the similarity values in the first similarity value matrix to acquire a first target simplified matrix corresponding to the first image.

17. A method as claimed in claim 16, wherein the acquiring the second target simplified matrix corresponding to the second image according to the intensity matrix corresponding to each of the pixels of the second image comprises:
   calculating the similarity value of the intensity matrix corresponding to each of the pixels of the second image and the preset matrix to acquire a second similarity value matrix;
   comparing each of the similarity values in the second similarity value matrix with the preset threshold value to acquire comparison results corresponding to each of the similarity values in the second similarity value matrix; and
   classifying each of the similarity values in the second similarity value matrix according to the comparison result corresponding to each of the similarity values in the second similarity value matrix to acquire a second target simplified matrix corresponding to the second image.

18. A method as claimed in claim 17, wherein the classifying each of the similarity values in the first similarity value matrix according to the comparison result corresponding to each of the similarity values in the first similarity value matrix to acquire the first target simplified matrix corresponding to the first image comprises:
   with respect to each of the similarity values in the first similarity value matrix, when the comparison result corresponding to the similarity value is that the similarity value is greater or equal to the preset threshold, classifying the similarity value as a first class, and when the comparison result corresponding to the similarity value is that the similarity value is less than the preset threshold, classifying the similarity value as a second class, so as to acquire a first target simplified matrix corresponding to the first image.

19. A method as claimed in claim 18, wherein the classifying each of the similarity values in the second similarity value matrix according to the comparison results corresponding to each of the similarity values in the second similarity value matrix to acquire the second target simplified matrix corresponding to the second image comprises:
   with respect to each of the similarity values in the second similarity value matrix, when the comparison result corresponding to the similarity value is that the similarity value is greater or equal to the preset threshold, classifying the similarity value as the first class, and when the comparison result corresponding to the similarity value is that the similarity value is less than the preset threshold, classifying the similarity value as the second class, so as to acquire a second target simplified matrix corresponding to the second image.

\* \* \* \* \*